US009549383B2

(12) United States Patent
Ma et al.

(10) Patent No.: US 9,549,383 B2
(45) Date of Patent: Jan. 17, 2017

(54) CLOCK SYNCHRONIZATION SYSTEM AND METHOD FOR BASE STATION

(71) Applicant: DATANG MOBILE COMMUNICATIONS EQUIPMENT CO., LTD., Beijing (CN)

(72) Inventors: Qiang Ma, Beijing (CN); Zhicong Han, Beijing (CN); Li Xu, Beijing (CN); Xiangu Xiao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 91 days.

(21) Appl. No.: 14/426,758

(22) PCT Filed: Jul. 31, 2013

(86) PCT No.: PCT/CN2013/080554
§ 371 (c)(1),
(2) Date: Mar. 9, 2015

(87) PCT Pub. No.: WO2014/040453
PCT Pub. Date: Mar. 20, 2014

(65) Prior Publication Data
US 2015/0237590 A1 Aug. 20, 2015

(30) Foreign Application Priority Data
Sep. 12, 2012 (CN) .......................... 2012 1 0337717

(51) Int. Cl.
H04W 56/00 (2009.01)
H04L 7/033 (2006.01)
H04W 88/10 (2009.01)

(52) U.S. Cl.
CPC ........ *H04W 56/0015* (2013.01); *H04L 7/0331* (2013.01); *H04W 88/10* (2013.01)

(58) Field of Classification Search
CPC .... H04W 56/0015; H04L 7/033; H04L 7/0331
USPC .................................. 370/503, 507
See application file for complete search history.

(56) References Cited

U.S. PATENT DOCUMENTS 6,072,842 A * 6/2000 Janesch ................. H03L 7/0991
375/326
6,711,230 B1 * 3/2004 Nicholls .................. G04G 3/00
327/147
2003/0231613 A1 * 12/2003 Bertrand .............. H04B 1/7073
370/350

(Continued)

FOREIGN PATENT DOCUMENTS

CN         1540884 A    10/2004
CN       102098776 A     6/2011

(Continued)

Primary Examiner — Farah Faroul
(74) Attorney, Agent, or Firm — Gokalp Bayramoglu

(57) ABSTRACT

The present application discloses a system and a method for clock synchronization of base stations. In the system for clock synchronization of base stations, a Global Positioning System (GPS) receiver on a main control board of a base station is connected to a GPS antenna feeder; the GPS receiver connected to the GPS antenna feeder is connected to a Phase-Locked Loop (PLL) on the present main control board and a PLL on other main control board; the main control boards are connected through a judgment line.

13 Claims, 8 Drawing Sheets

(56) References Cited

U.S. PATENT DOCUMENTS

| | | | |
|---|---|---|---|
| 2007/0207836 A1 | 9/2007 | Gormley et al. | |
| 2009/0221319 A1 | 9/2009 | Lan et al. | |
| 2011/0103337 A1* | 5/2011 | Bryant | G04G 7/02 |
| | | | 370/329 |
| 2012/0069943 A1 | 3/2012 | Lim et al. | |
| 2012/0139647 A1* | 6/2012 | Schoepf | H03B 5/32 |
| | | | 331/35 |
| 2013/0308532 A1* | 11/2013 | Yu | H04W 88/08 |
| | | | 370/328 |
| 2015/0110234 A1* | 4/2015 | Yu | H04B 1/406 |
| | | | 375/376 |

FOREIGN PATENT DOCUMENTS

| | | |
|---|---|---|
| CN | 102308643 A | 1/2012 |
| CN | 102869085 A | 1/2013 |
| GB | 2387752 A | 10/2003 |

\* cited by examiner

CLOCK SYNCHRONIZATION SYSTEM AND METHOD FOR BASE STATION

This application claims the priority of Chinese Patent Application No. 201210337717.6, titled as "System and Method for Clock Synchronization of Base Stations", filed on Sep. 12, 2012 in the State Intellectual Property Office of China, the disclosure of which is incorporated herein by reference.

TECHNICAL FIELD

The present application relates to the field of communication technologies, and particularly to a system for clock synchronization of base stations and a method for clock synchronization of base stations with multiple base stations sharing a hardware platform.

BACKGROUND ART

In the field of radio access network, equipment manufacturers will usually develop a variety of access devices with multiple modes on one hardware platform, such as base stations with modes of wideband CDMA (WCDMA), Time Division-Synchronous CDMA (TD-SCDMA), Code Division Multiple Access (CDMA), LTE Time Division Duplexing (LTE-TDD), LTE Frequency Division Duplexing (LTE-FDD) and the like. In order to save costs, clock board is often designed to be combined with main control board and transmission board as one piece. More and more emergence of multi-mode integration scenarios, for example, an evolved integration of the TD-SCDMA and the LTE-TDD, and a mode integration of the LTE-TDD and the LTE-FDD, may induce integration in an isolated condition of maintenance and service of the hardware platform, that is, the device may appear in two radio operation-maintenance networks at the same time.

The particularity of the clock synchronization signal has determined that only one clock source is provided in one machine frame at any time. That is, multiple base station systems (two base station systems in general) in the same machine frame can use only one clock. In prior art, usually, following two schemes could be selected to solve the problem about the clock source of two base station systems in the same machine frame. In the first scheme, as shown in FIG. 1, layout of the boards of the platform is redesigned such that the clock board is separated to form a mode of clock board+main control board+base band board; in the second scheme, as shown in FIG. 2, a main control board in a certain base station is used as a clock output board, so that dual-mode base station system could be coupled with the platform independence sacrificed.

For above first scheme in prior art, it is necessary to redefine the function distribution of the boards of the platform and develop new boards, so that there is a great impact on existing commercial equipments, and original platform evolution ideas would be changed, resulting in high costs. For above second scheme in prior art, the main control board capable of outputting clock does not used to output clock, which is a waste of capability of the device, and with over coupling. Mode A could not operate independently of Mode B; especially when the Mode B is upgraded, Mode A may be caused out of service, which would be not acceptable from the point of operators.

As it could be seen, although above two existing schemes may solve the problem of clock synchronization of multiple base station system in the same machine frame to some extent, they have problems such as high costs, loss or waste of function and the like, such that the clock synchronization of multi-mode base station system in the same machine frame could not be achieved in a simple, effective, low-cost manner.

SUMMARY OF THE INVENTION

The present application provides a system for clock synchronization of base stations and a method for clock synchronization of base stations with multiple base stations sharing a hardware platform, in order to solve the problems that the clock synchronization of multi-mode base station system in the same machine frame could not be achieved in a simple, effective, low-cost manner in prior art.

To solve the above problems, the present application discloses a system for clock synchronization of base stations, including a plurality of base stations in a same machine frame, each base station having a main control board, wherein the main control board of each base station is provided with a Global Positioning System GPS receiver, a Phase-Locked Loop PLL and an Oven Controlled Crystal Oscillator OCXO; the GPS receiver on the main control board of one of the base stations is connected to a GPS antenna feeder; the GPS receiver connected to the GPS antenna feeder is connected to a PLL on the present main control board and a PLL on the main control board of other base stations; the main control boards of base stations are connected by a judgment line; wherein the GPS receiver connected to the GPS antenna feeder is configured to send a clock signal to the PLL on the present main control board and the PLL on the main control board of other base stations, and the clock signal is processed to form a clock reference signal corresponding to each base station by the PLL and the OCXO on each main board; and the judgment line is configured to provide each base station with respective states in which other base stations use clock reference signals, so as to each base station determining whether to output the clock reference signal of the present base station according to the respective states in which other base stations use clock reference signals.

Preferably, in addition to the GPS receiver connected to the GPS antenna feeder, the GPS receiver on the main control board of other base station is connected to the PLL on the present main control board and the PLL on the main control board of other base station in addition to the present base station.

Preferably, the plurality of base stations include a first base station and a second base station; the main control boards of the first base station and the second base station are connected through a first judgment line and a second judgment line, the first judgment line being configured to provide the first base station with the state in which the second base station uses the clock reference signal of the second base station, and the second judgment line being configured to provide the second base station with the state in which the first base station uses the clock reference signal of the first base station.

Preferably, each of the first judgment line and the second judgment line comprises a board-in-place signal line, a clock lock signal line and a clock-in-use signal line; each of the states in which the first base station and the second base station use respective clock reference signal comprises a board-in-place state, a clock lock state and a clock-in-use state, wherein the board-in-place state is configured to indicate whether the main control board of the present base station is in place, the clock lock state is configured to indicate whether the clock reference signal of the present base station is clocked by the present base station, and the clock-in-use state is configured to indicate whether the clock reference signal of the present base station is used by all base stations in the same machine frame.

Preferably, when the first/second base station judges whether to output the clock reference signal of the present base station according to the state in which the second/first base station uses respective clock reference signal, if the first/second base station determines the main control board of the second/first base station is not in place and its clock reference signal is not being used by all base stations according to the state in which the second/first base station uses its clock reference signal, then the first/second base station outputs the clock-in-use signal and the clock lock signal to the second/first base station, and outputs the clock reference signal thereof as a clock reference signal of all base stations;

if the first/second base station determines the main control board of the second/first base station is in place and its clock reference signal is not being used by all base stations according to the state in which the second/first base station uses its clock reference signal, then the first/second base station outputs the clock lock signal to the second/first base station, outputs the clock-in-use signal to the second/first base station after determining that the clock reference signal of the second/first base station is not being locked, and outputs the clock reference signal thereof as a clock reference signal of all base stations; and if the first/second base station determines the main control board of the second/first base station is in place and its clock reference signal is not being used by all base stations according to the state in which the second/first base station uses the clock reference signal, then the first/second base station outputs the clock lock signal to the second/first base station, and judges whether the clock reference signal of the second/first base station is being used by all base stations again after determining that the clock reference signal of the second/first base station is locked, and if the clock reference signal of the second/first base station is not being used by all base stations, then the first/second base station outputs the clock-in-use signal to the second/first base station and outputs the clock reference signal thereof as a clock reference signal of all base stations.

Preferably, if the first/second base station outputting the clock reference signal is faulted, the second/first base station judges whether the clock reference signal of the present base station is locked; if so, the second/first base station outputs the clock-in-use signal and outputs the clock reference signal of the present base station; if not, the second/first base station judges whether the clock reference signal of the present base station is enabled, if enabled, then the second/first base station outputs the clock-in-use signal and outputs the clock reference signal of the present base station.

Preferably, the GPS receiver on the main control board of each of the base stations is connected to a GPS antenna feeder.

To solve the above problems, the present application also discloses a method for clock synchronization of base stations, wherein the method includes:

a first base station receiving an external clock signal through a first GPS antenna feeder connected to a GPS receiver on a main control board, sending the external clock signal to a PLL on the main control board of the first base station and a PLL on a main control board of a second base station, and processing the external clock signal through the PLLs and the OCXOs on the main control boards of the first base station and the second base station respectively, to form a first clock reference signal and a second clock reference signal, wherein the GPS receiver on the main control board of the first base station is connected to the PLL on the present main control board and the PLL on the main control board of the second base station; and the first base station obtaining a state in which the second base station uses the second clock reference signal through a first judgment line connected to the second base station, and determining whether to output the first clock reference signal or the second clock reference signal according to the state.

Preferably, the GPS receiver on the main control board of the second base station is connected to the PLL on the present main control board and the PLL on the main control board of the first base station; and the GPS receiver on the main control board of the second base station is connected to a second GPS antenna feeder.

Preferably, the step of the first base station obtaining a state in which the second base station uses the second clock reference signal through a first judgment line connected to the second base station, includes:

the first base station obtaining the state in which the second base station uses the second clock reference signal through a board-in-place signal line, a clock lock signal line and a clock-in-use signal line connected to the second base station, wherein the state includes a board-in-place state, a clock lock state and a clock-in-use state, the board-in-place state being configured to indicate whether the main control board of the present base station is in place, the clock lock state being configured to indicate whether the clock reference signal of the present base station is clocked by the present base station, and the clock-in-use state being configured to indicate whether the clock reference signal of the present base station is being used by all base stations in the same machine frame.

Preferably, the method for clock synchronization of base stations further includes:

the second base station obtaining the state in which the first base station uses the first clock reference signal through a second judgment line connected to the first base station, wherein the second judgment line includes a board-in-place signal line, a clock lock signal line and a clock-in-use signal line.

Preferably, the step of the first base station determining whether to output the first clock reference signal or the second clock reference signal according to the state, includes:

if the first base station determines the main control board of the second base station is not in place and the second clock reference signal is not being used by all base stations according to the state in which the second base station uses the second clock reference signal, then the first base station outputs the clock-in-use signal and the clock lock signal to the second base station, and outputs the first clock reference signal of the present base station as a clock reference signal of all base stations;

if the first base station determines the main control board of the second base station is in place and the second clock reference signal is not being used by all base stations according to the state in which the second base station uses the second clock reference signal, then the first base station outputs the clock lock signal to the second base station, outputs the clock-in-use signal to the second base station after determining that the second clock reference signal is not being locked, and outputs the first clock reference signal of the present base station as a clock reference signal of all base stations;

if the first base station determines the main control board of the second base station is in place and the second clock reference signal is not being used by all base stations according to the state in which the second base station uses the second clock reference signal, then the first base station outputs the clock lock signal to the second base station, and judges whether the second clock reference signal is being used by all base stations again after determining that the second clock reference signal is locked, and if the second clock reference signal is not being used by all base stations, then the first base station outputs the clock-in-use signal to the second base station and outputs the first clock reference signal of the present base station as a clock reference signal of all base stations.

Compared with the prior art, the present application has the following, advantages:

In the case of a plurality of base stations (for example, two base stations with different modes) in a same machine frame, in the present application, a GPS receiver on a main control board of a base station is connected to a GPS antenna feeder, and further the GPS receiver is connected to a PLL on the present main control board and PLL on a main control board of other base stations, thereby enabling an input sharing of the signal received by the GPS receiver. Moreover, the main control boards of respective base stations could be connected by judgment lines, and each base station determines whether to output the clock reference signal of the present base station according to the respective states in which other base stations use clock reference signals provided by the judgment lines, thereby enabling hardware connection to judge the clock output. As it could be seen, the system for clock synchronization of base stations in the present application makes less modifications to the main control board of the conventional base station, retains existing platform evolution ideas, need not develop a new board and has low costs, thereby effectively solving the problems in prior art that the clock synchronization of multi-mode base station system in the same machine frame could not be achieved in a simple, effective, low-cost manner. Further, the front-end signal of each main control board can be shared such that backup clocks are increased, improving the reliability of system; the two systems are decoupled and are completely independent in operation-maintenance and business without mutual interference.

DETAILED DESCRIPTION OF THE EMBODIMENTS

In order to readily understand above objects, features and advantages of the present application, the present application will be described in detail below in conjunction with accompanying drawings and specific embodiments.

First Embodiment

Figure 1:
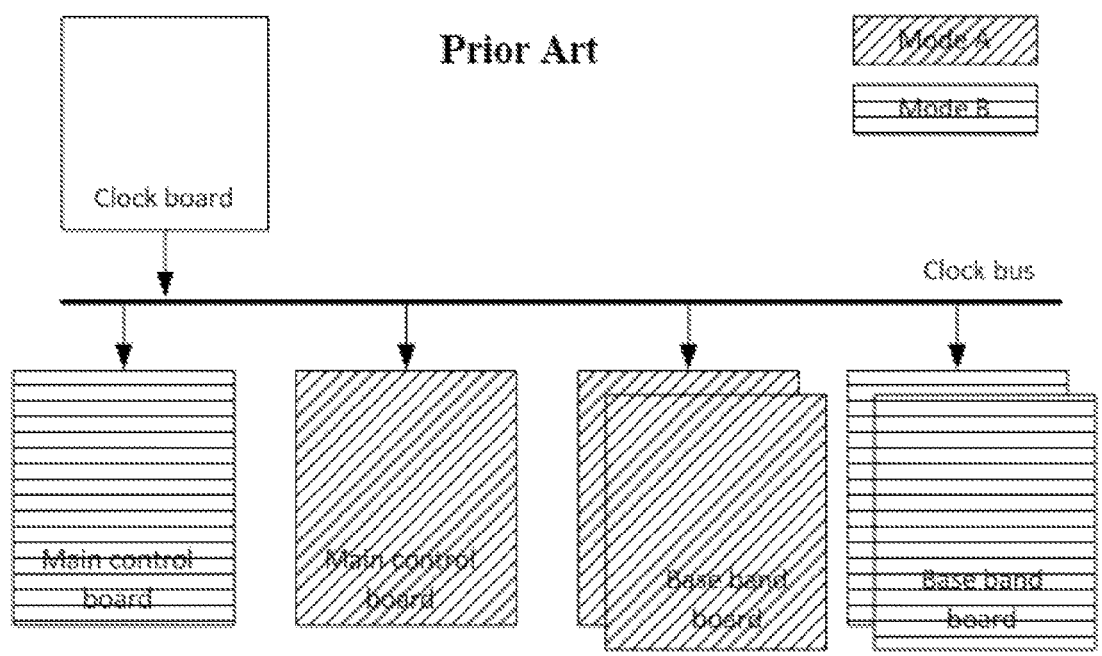
FIG. 1 is a schematic diagram of using the first scheme to realize clock source of two base station systems in the same machine frame in prior art.
Figure 2:
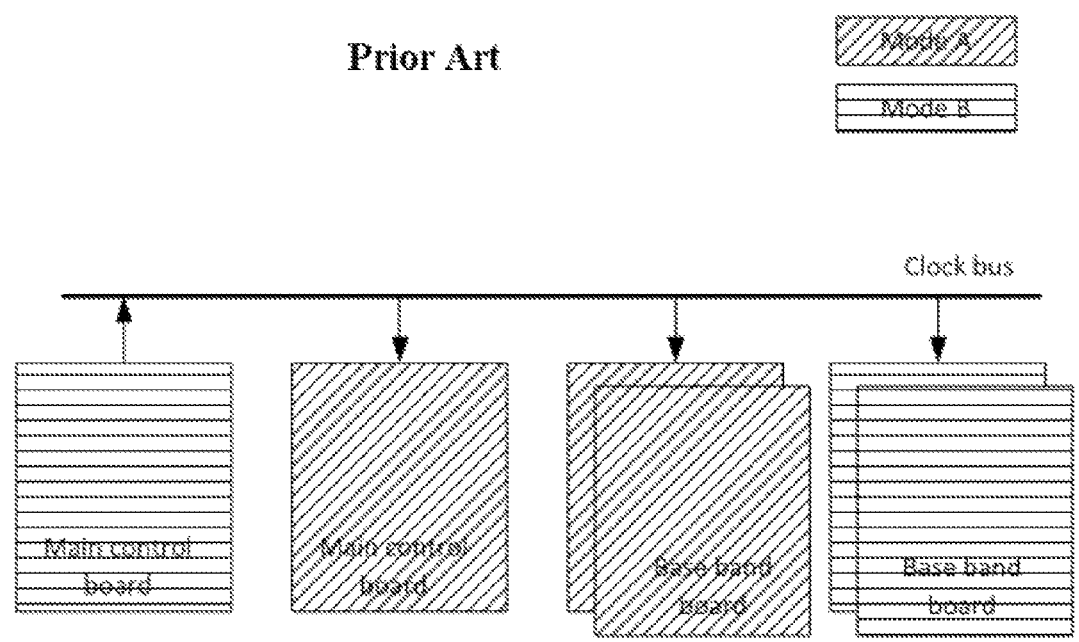
FIG. 2 is a schematic diagram of using the second scheme to realize clock source of two base station systems in the same machine frame in prior art.
Figure 3:
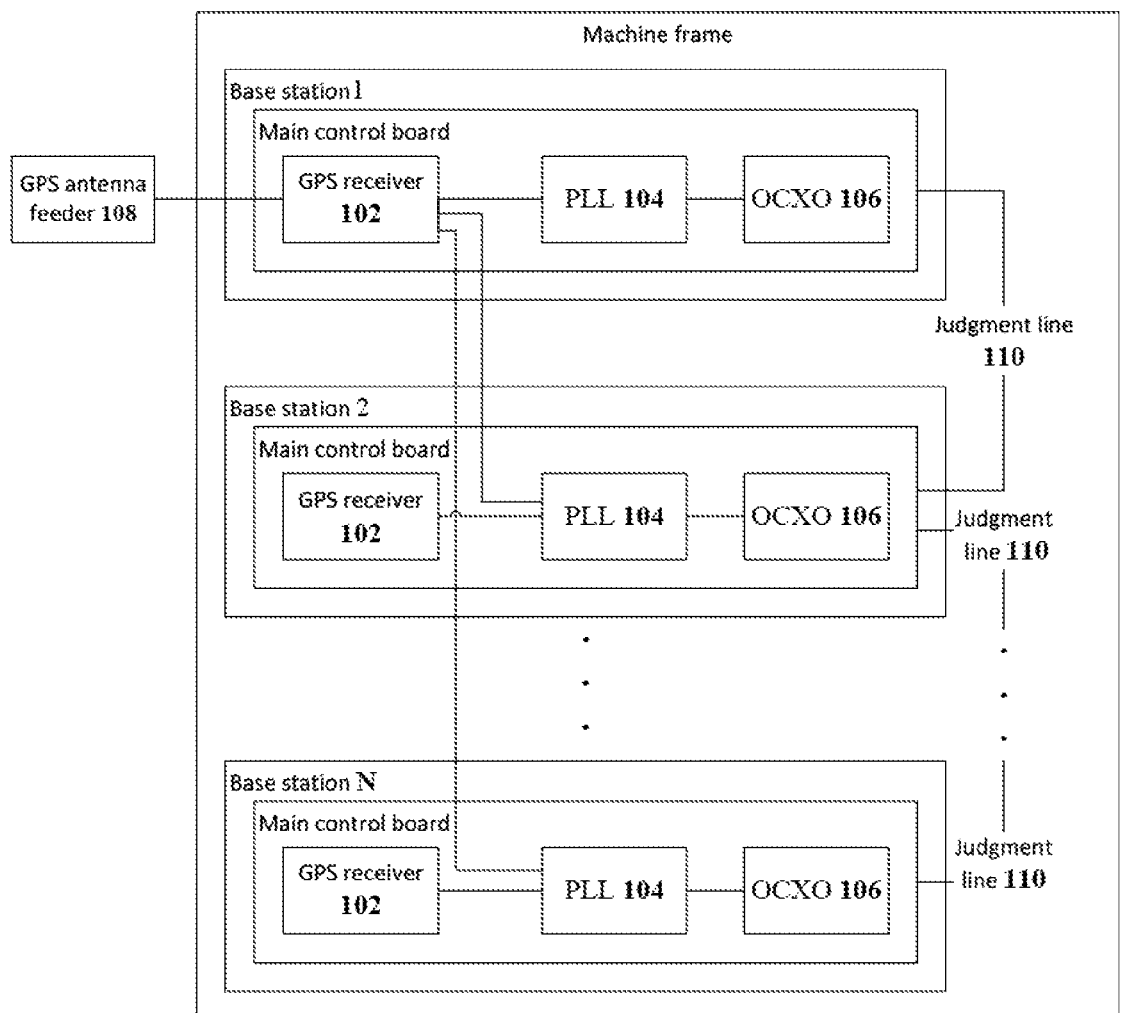
FIG. 3 is a schematic block diagram of a system for clock synchronization of base stations according to a first embodiment of the present application.

With reference to FIG. 3, it shows a schematic block diagram of a system for clock synchronization of base stations according to a first embodiment of the present application.

In this embodiment, the system for clock synchronization of base stations may particularly include a plurality of base stations (for example, two base stations with different modes) in a same machine frame. Each base station may particularly comprise a main control board. The main control board of each base station may be provided with a Global Positioning System (GPS) receiver 102, a Phase-Locked Loop (PLL) 104 and an Oven Controlled Crystal Oscillator (OCXO) 106.

Herein, at least one of the base stations, in this embodiment, for example, one of the base stations is configured such that the GPS receiver 120 on the main control board of the base station is connected to an external GPS antenna feeder 108. The GPS receiver 102 connected to the GPS antenna feeder 108 may be connected to a PLL on the present main control board and a PLL on the main control board of other base stations. The main control boards of other base stations could be connected by a judgment line 110.

Herein, the GPS receiver 102 connected to the GPS antenna feeder 108 is configured to send a clock signal to the PLL on the present main control board and the PLL on the main control board of other base stations, and the clock signal is processed to form a clock reference signal corresponding to each base station by the PLL and the OCXO on each main board. Herein, the processing of the PLL and the OCXO on each main control board to the clock signal sent by the GPS receiver could make reference to existing procedures. For example, the GPS receiver may send the received clock signal to the PLL, the PLL module could modulate the frequency of the clock signal outputted from the OCXO, and finally the clock signal outputted from the OCXO may accurately follow a Pulse Per Second (PPS) signal of GPS to generate the corresponding clock reference signal.

The judgment line 110 is configured to provide each base station with respective states in which other base stations use clock reference signals, so as to each base station determining whether to output the clock reference signal of the present base station according to the respective states in which other base stations use clock reference signals.

By this embodiment, in the case of a plurality of base stations in the same machine frame, the GPS receiver on the main control board of the base station is connected to the GPS antenna feeder, and further the GPS receiver is connected to the PLL on the present main control board and PLL on the main control board of other base stations, thereby enabling an input sharing of the signal received by the GPS receiver. Moreover, the main control boards of respective base stations could be connected by the judgment lines, and each base station determines whether to output the clock reference signal of the present base station according to the respective states in which other base stations use clock reference signals provided by the judgment lines, thereby enabling hardware connection to judge the clock output. As it could be seen, the system for clock synchronization of base stations in this embodiment makes less modifications to the main control board of the conventional base station, retains existing platform evolution ideas, need not develop a new board and has low costs, thereby effectively solving the problems in prior art that the clock synchronization of multi-mode base station system in the same machine frame could not be achieved in a simple, effective, low-cost manner. Further, the front-end signal of each main control board can be shared such that backup clocks are increased, improving the reliability of system; the two systems are decoupled and are completely independent in operation-maintenance and business without mutual interference.

Second Embodiment

Figure 4:
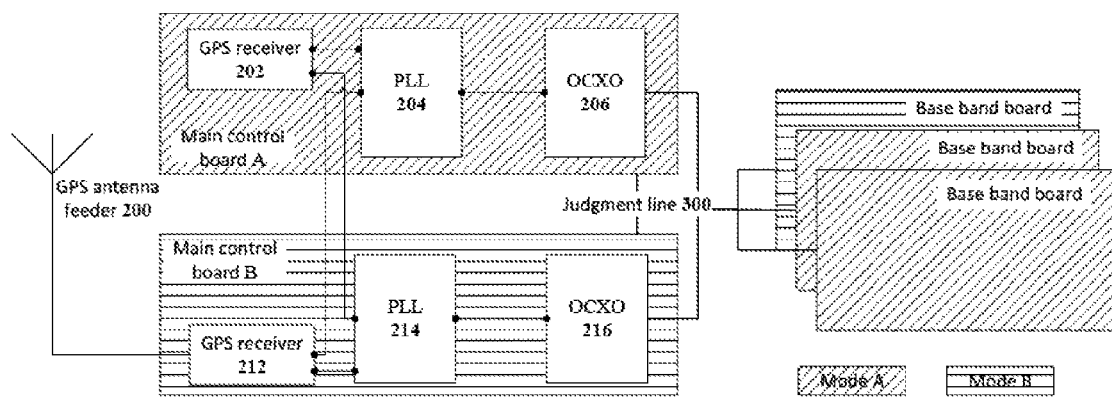
FIG. 4 is a schematic block diagram of a system for clock synchronization of base stations according to a second embodiment of the present application.

With reference to FIG. 4, it shows a schematic block diagram of a system for clock synchronization of base stations according to a second embodiment of the present application.

In order to apparently explain the clock synchronization system for base station in this embodiment, a structure of the clock synchronization information processing of individual main control board will be first illustrated below.

Figure 5:
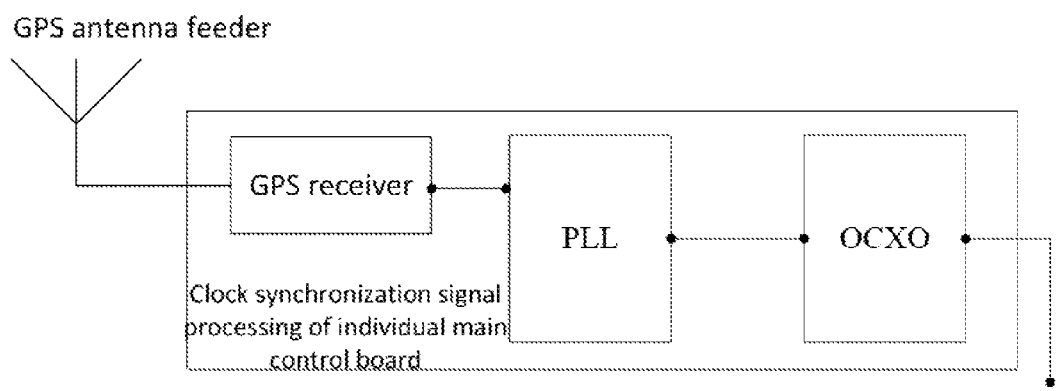
FIG. 5 is a schematic block diagram of a structure for processing clock synchronization information in individual main control board in the embodiment as shown in FIG. 4.

As shown in FIG. 5, the clock synchronization information processing of individual main control board on the hardware platform may includes functional units of a GPS antenna feeder, a GPS receiver, a PLL and an OCXO. These functional units are designed on the main control board to constitute a clock synchronization function of the system. A GPS clock signal may be received by the GPS antenna feeder and sent to the GPS receiver; the GPS receiver may receive the GPS clock signal to obtain the PPS signal therein, and send to the PLL; the PLL module could modulate the frequency of the clock signal outputted from the OCXO, and finally the clock signal outputted from the OCXO may accurately follow the PPS signal of GPS to generate and output the clock reference signal upon processing.

In this embodiment, the multiple base stations in the system for clock synchronization of base stations may be two base stations with different modes, namely, a first base station and a second base station. Each of the base stations has a respective main control board, namely, a main control board A of the first base station and a main control board B of the second base station. Each of main control boards is provided with a GPS receiver, a PLL and an OCXO.

FIG. 4 shows the processing structure of the clock synchronization information by the system for clock synchronization of base stations, i.e., the processing structure of the clock synchronization information of two main control boards in two base stations with different modes. One end of the GPS receiver 212 on the main control board B is connected to the GPS antenna feeder 200, and the other end thereof is connected to the PLL 204 on the main control board A and the PLL 214 on the main control board B using two hardware connecting wires, respectively; the PLL 214 on the main control board B is connected to the OCXO 216 on the main control board B, and the PLL 204 on the main control board A is connected to the OCXO 206 on the main control board A; then, the OCXO 216 on the main control board B and the OCXO 206 on the main control board A are both connected to base hand boards on two base stations (i.e., the first base station and the second base station). The main control board A and the main control board B are connected to each other by the judgment line 300.

The GPS receiver 212 on the main control board B receives the clock signal from the GPS antenna feeder 200, and then sends it to the PLL 214 on the main control board B and the PLL 204 on the main control board A via the two hardware connecting wires, respectively. On the main control board B, the clock signal sent by the GPS receiver 212 generates a second clock reference signal after being processed by the PLL 214 and the OCXO 216; on the main control board A, the clock signal sent by the GPS receiver 212 generates a first clock reference signal after being processed by the PLL 204 and the OCXO 206.

After the first clock reference signal and the second clock reference signal is generated, the first base station and the second base station may obtain the respective state in which other base station uses clock reference signal through the judgment line 300. That is, the first base station obtains the state in which the second base station uses the second clock reference signal by the judgment line, and the second base station obtains the state in which the first base station uses the first clock reference signal by the judgment line; then, the first base station and the second base station may determine whether to output the clock reference signal of own base station as a clock reference signal of all base stations in the machine frame, according to the state in which the other base station uses the clock reference signal.

Preferably, the judgment line may be bidirectional judgment lines, i.e., particularly including a first judgment line and a second judgment line, wherein the first judgment line is configured to provide the first base station with the state in which the second base station uses the clock reference signal of the second base station, and the second judgment line is configured to provide the second base station with the state in which the first base station uses the clock reference signal of the first base station. The bidirectional judgment line makes the design of circuit and the acquisition of state information more simple and apparent. However, the present application is not limited thereto. In practice, a person skilled in the art may arrange the judgment line as necessary. For example, only one judgment line can be arranged between two main control boards to provide information in two directions.

More preferably, the judgment line may include three signal lines, which could be a board-in-place signal line, a clock lock signal line and a clock-in-use signal line, respectively. Accordingly, the three signal lines may provide the other base station with the states in which the respective base station uses respective clock reference signal, namely a board-in-place state, a clock lock state and a clock-in-use state, wherein the board-in-place state is configured to indicate whether the main control board of the present base station is in place, the clock lock state is configured to indicate whether the clock reference signal of the present base station is clocked by the present base station, and the clock-in-use state is configured to indicate whether the clock reference signal of the present base station is used by all base stations in the same machine frame. By the three signal lines and the three states of using the clock reference signal, the base station is allowed to directly and quickly obtain the clock information of other base stations, improving the speed of judgment and output of the clock reference signal.

Preferably, the GPS receivers and the PLLs are mutually cross-connected between the main control boards. Particularly, in this embodiment, in addition to the GPS receiver 212 on the main control board B of the second base station connected to the GPS antenna feeder 200, the GPS receiver 202 on the main control board A of other base station (i.e., the first base station) is connected to the PLL 204 on the present main control board (i.e., the main control board A) and the PLL 214 on the main control board B of other base station (i.e., the second base station) in addition to the present base station (i.e., the first base station). In other words, the GPS receivers and the PLLs are mutually cross-connected between the main control boards via 4 hardware connecting wires.

Figure 6:
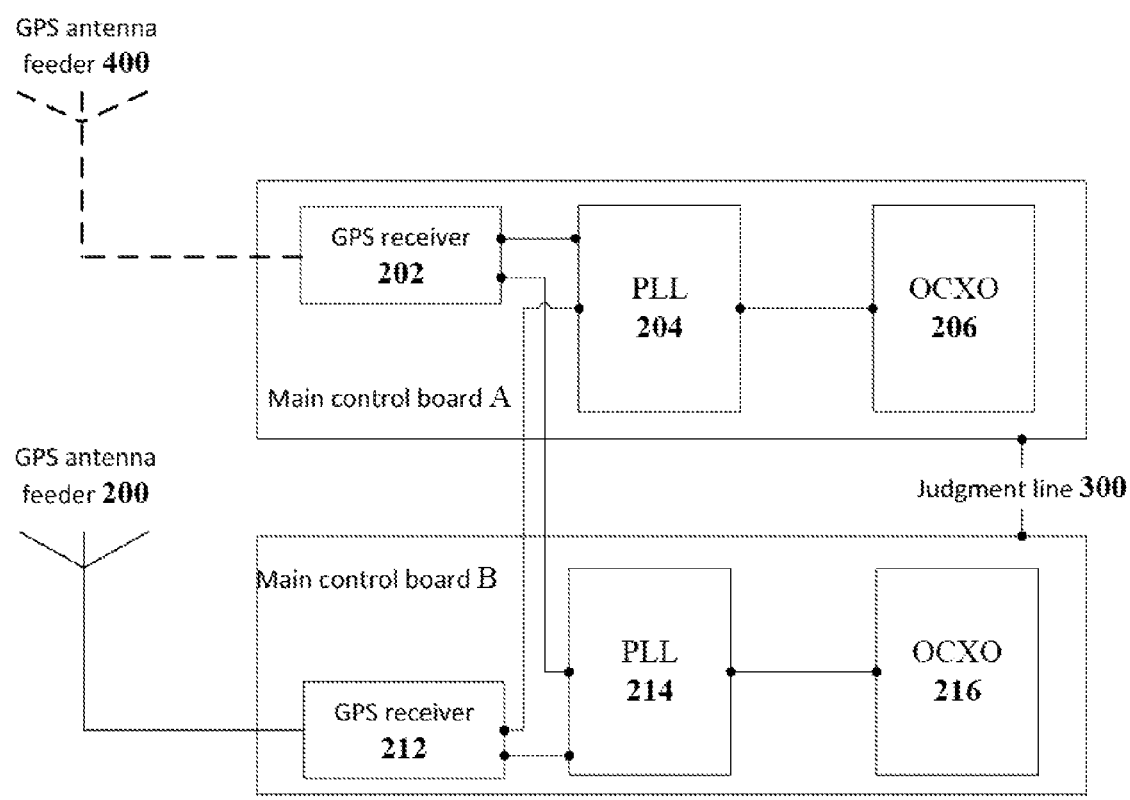
FIG. 6 is a schematic block diagram of a structure for processing GPS clock signal sharing in the embodiment as shown in FIG. 4.

Preferably, the GPS receiver on the main control board of each of base stations is connected to a GPS antenna feeder. Particularly, in this embodiment, as shown in FIG. 6, it is a schematic block diagram of a structure for processing GPS clock signal sharing according to the embodiment. In FIG. 6, the GPS receiver on the main control board A of the first base station is also connected to another GPS antenna feeder 400 to form a mutual hot backup of clock synchronization between two main control boards, whereby effectively improving the reliability of the equipment no matter which main control board is faulted (for example, the main control board is removed or disabled), the clock can be switched immediately, whereby effectively ensuring the continuity and stability of the clock.

Based on the above structure and taking the first base station as an example, in the output of the clock, if the first base station determines the main control board of the second base station is not in place and its clock reference signal is not being used by all base stations according to the state in which the second base station uses the clock reference signal, then the first base station may output the clock-in-use signal and the clock lock signal to the second base station, and may output the clock reference signal thereof as a clock reference signal of all base stations; if the first base station determines the main control board of the second base station is in place and its clock reference signal is not being used by all base stations according to the state in which the second base station uses the clock reference signal, then the first base station may output the clock lock signal to the second base station, and may output the clock-in-use signal to the second base station after determining that the clock reference signal of the second base station is not being locked, and may output the clock reference signal thereof as a clock reference signal of all base stations; if the first base station determines the main control board of the second base station is in place and its clock reference signal is not being used by all base stations according to the state in which the second base station uses the clock reference signal, then the first base station may output the clock lock signal to the second base station, and may judge whether the clock reference signal of the second base station is being used by all base stations again after determining that the clock reference signal of the second base station is locked, and if the clock reference signal of the second base station is not being used by all base stations, then the first base station may output the clock-in-use signal to the second base station and output the clock reference signal thereof as a clock reference signal of all base stations. When the second base station is taken as an example, the first base station in the above procedure is changed to the second base station and the second base station is changed to the first base station.

Still taking the first base station as an example, if the first base station outputting the clock reference signal is faulted, the second base station may judge whether its clock reference signal is locked; if so, the second base station may output the clock-in-use signal and output its clock reference signal; if not, the second base station may judge whether its clock reference signal is enabled, if enabled, then the second base station may output the clock-in-use signal and output its clock reference signal; if disabled, then the second base station may close its clock output. When the second base station is taken as an example, the first base station in the above procedure is changed to the second base station and the second base station is changed to the first base station.

In this embodiment, when two main control boards exist in the same system, only one main control board can output the clock, which constitutes a competitive relationship of the clock output and needs to make a decision. The embodiment employs a hardware judgment, in which by the judgment lines, the clock output right is randomly pre-empted according to the state of clock reference signal used by a base station and the base station with no pre-emption closes the clock output. In addition, since each of the main boards is provided with a GPS receiver, the embodiment explores the application potential of the GPS receiver to eliminate engineering restrictions on the GPS antenna feeder connection, and the embodiment sends the output signal of the GPS receiver to the Phase-Locked Loops (PLLs) of two main control boards, respectively, by sharing the output signal of the GPS receiver, such that the sharing of GPS clock signals of multiple base stations can be achieved by only one GPS antenna feeder. The GPS receivers and the PLLs are mutually cross-connected between two main control boards via 4 hardware connecting wires; the GPS receiver sends TOD (Time Of Data) and PP1S (Pulse Per 1 Second) hardware signal to the PLL of the present main control board and the PLL of another main control board; one-way GPS antenna feeder is used to connect to one any board to remove the engineering restrictions on the GPS antenna feeder connection, or bidirectional GPS antenna feeder is simultaneously inputted to the two main control boards to realize a clock synchronization backup; the base station in the machine frame would choose any one of available clock locks and provide the base band board with the clock output.

By this embodiment, only one GPS antenna feeder is required by a plurality of base stations in the same machine frame, and the clock output of a plurality of base stations and a normal output of a plurality of main control boards after clock switching could be satisfied without using a power divider; meanwhile, requirements of GPS antenna feeder connection of dual-mode station on the engineering can be solved, greatly reducing the number and the cost of GPS antenna feeder.

It should be noted that, although the embodiment takes two base stations as an example, it is apparent to the person skilled in the art that the case where more than two base stations exist in the same machine frame could also be made with reference to the clock synchronization according to this embodiment.

Third Embodiment

Figure 7:
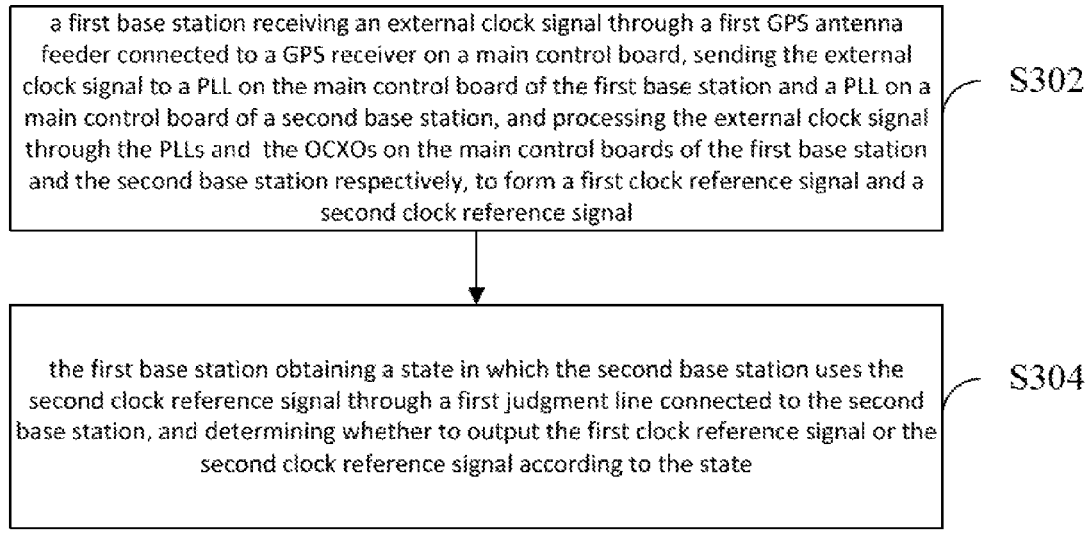
FIG. 7 is a flow chart of a method for clock synchronization of base stations according to a third embodiment of the present application.

With reference to FIG. 7, it shows a flow chart of a method for clock synchronization of base stations according to a third embodiment of the present application.

The method for clock synchronization of base stations according to this embodiment may particularly include the following, steps:

Step S302: a first base station receiving an external clock signal through a first GPS antenna feeder connected to a GPS receiver on a main control board, sending the external clock signal to a PLL on the main control board of the first base station and a PLL on a main control board of a second base station, and processing the external clock signal through the PLLs and the OCXOs on the main control boards of the first base station and the second base station respectively, to form a first clock reference signal and a second clock reference signal.

Herein, the GPS receiver on the main control board of the first base station is connected to the PLL on the present main control board and the PLL on the main control board of the second base station.

The first base station and the second base station may be disposed in the same machine frame and may have different mode. The first base station and the second base station may each include a main control board, the main control board of each of the base stations may be configured with a GPS receiver, a PLL and an OCXO. Herein, one end of the GPS receiver on the main control board of the first base station is connected to the GPS antenna feeder, and the other end thereof is connected to the PLL of the present the main control board and the PLL on the main control board of the second base board respectively. The main control boards of the first base station and the second base station are connected to each other through a hardware judgment line. The judgment line is used to provide each base station with states in which the other base station uses its clock reference signal, such as a board-in-place signal, a clock lock signal and a clock-in-use signal.

Preferably, the GPS receiver on the main control board of the second base station is connected to the PLL on the present main control board and the PLL on the main control board of the first base station.

Preferably, the GPS receiver on the main control board of the second base station is connected to a second GPS antenna feeder.

Step S304: the first base station obtaining a state in which the second base station uses the second clock reference signal through a first judgment line connected to the second base station, and determining whether to output the first clock reference signal or the second clock reference signal according to the state.

Preferably, the first judgment line may include a board-in-place signal line, a clock lock signal line and a clock-in-use signal line, and the first base station may obtain the state in which the second base station uses the second clock reference signal through a board-in-place signal line, a clock lock signal line and a clock-in-use signal line connected to the second base station, wherein the state may particularly include a board-in-place state, a clock lock state and a clock-in-use state, the board-in-place state being configured to indicate whether the main control board of the present base station is in place, the clock lock state being configured to indicate whether the clock reference signal of the present base station is clocked by the present base station, and the clock-in-use state being configured to indicate whether the clock reference signal of the present base station is used by all base stations in the same machine frame.

Preferably, the second base station may obtain the state in which the first base station uses the first clock reference signal through a second judgment line connected to the first base station, wherein the second judgment line may also include a board-in-place signal line, a clock lock signal line and a clock-in-use signal line.

Preferably, if the first base station determines the main control board of the second base station is not in place and the second clock reference signal is not being used by all base stations according to the state in which the second base station uses the second clock reference signal, then the first base station may output the clock-in-use signal and the clock lock signal to the second base station, and may output the first clock reference signal of the present base station as a clock reference signal of all base stations;

if the first base station determines the main control board of the second base station is in place and the second clock reference signal is not being used by all base stations according to the state in which the second base station uses the second clock reference signal, then the first base station may output the clock lock signal to the second base station, may output the clock-in-use signal to the second base station after determining that the second clock reference signal is not being locked, and may output the first clock reference signal of the present base station as a clock reference signal of all base stations;

if the first base station determines the main control board of the second base station is in place and the second clock reference signal is not being used by all base stations according to the state in which the second base station uses the second clock reference signal, then the first base station may output the clock lock signal to the second base station, and may judge whether the second clock reference signal is being used by all base stations again after determining that the second clock reference signal is locked, and if the second clock reference signal is not being used by all base stations, then the first base station may output the clock-in-use signal to the second base station and output the first clock reference signal of the present base station as a clock reference signal of all base stations.

Preferably, if one of the two base stations if faulted, a failure of the first base station will be taken as an example. If the first base station outputting the clock reference signal is faulted, the second base station may judge whether its clock reference signal is locked; if so, the second base station may output the clock-in-use signal and output its clock reference signal; if not the second base station may judge whether its clock reference signal is enabled, if enabled, then the second base station may output the clock-in-use signal and output its clock reference signal if disabled, then the second base station may close its clock output.

By this embodiment, in the case of two base stations with different modes in the same machine flame, the GPS receiver on the main control board of the base station is connected to the GPS antenna feeder, and further the GPS receiver is connected to the PLL on the present main control board and PLL on the main control board of other base stations, thereby enabling an input sharing of the signal received by the GPS receiver. Moreover, the main control boards of respective base stations could be connected by the judgment lines, and each base station determines whether to output the clock reference signal of the present base station according to the respective states in which other base stations use clock reference signals provided by the judgment lines, thereby enabling hardware connection to judge the clock output. In addition, this embodiment makes less modifications to the main control board of the conventional base station, retains existing platform evolution ideas, need not develop a new board and has low costs, thereby effectively solving the problems in prior art that the clock synchronization of multi-mode base station system in the same machine frame could not be achieved in a simple, effective, low-cost manner. Further, the front-end signal of each main control board can be shared such that backup clocks are increased, improving the reliability of system; the two systems are decoupled and are completely independent in operation-maintenance and business without mutual interference.

Figure 8:
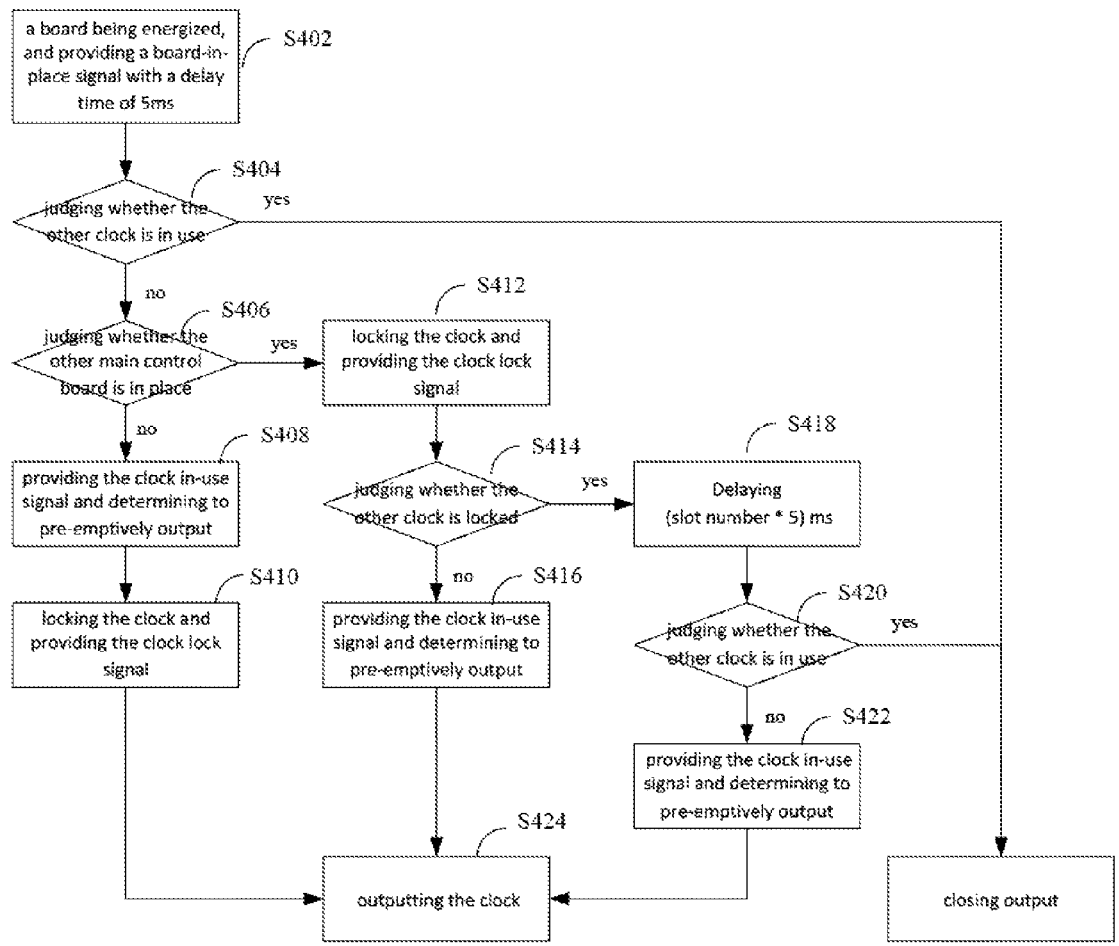
FIG. 8 is a flow chart of a method for clock synchronization of base stations according to a fourth embodiment of the present application.
Figure 9:
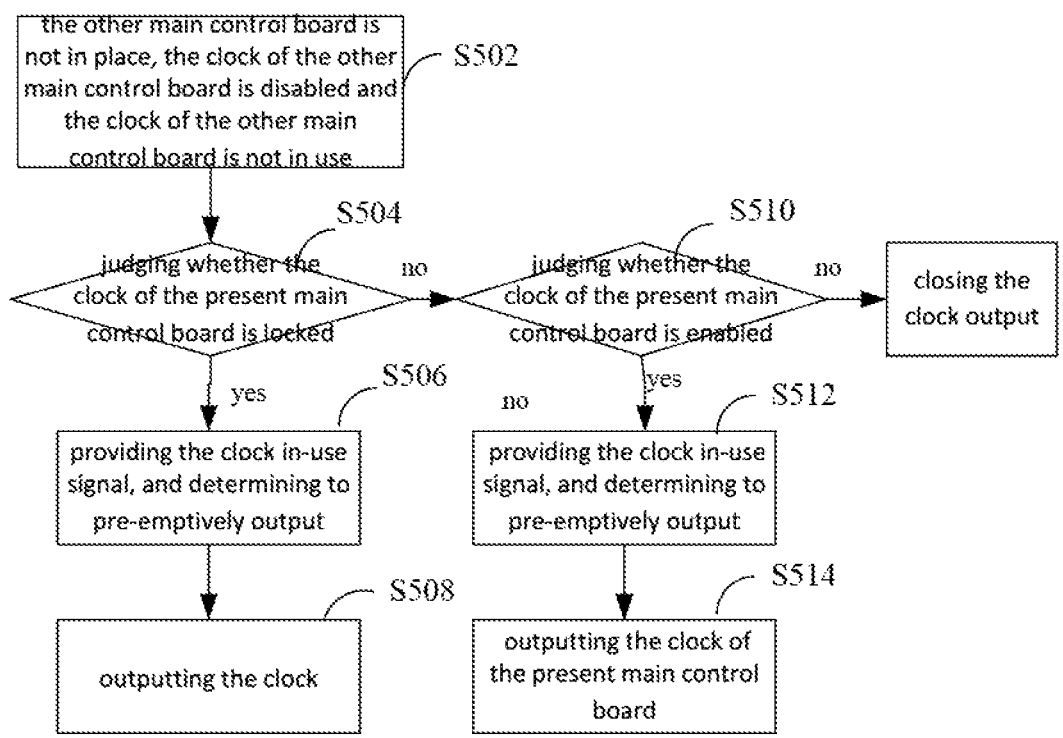
FIG. 9 is a flow chart of switching clock for base stations according to a fifth embodiment of the present application.

Hereinafter, the clock synchronization scheme of base stations according to the present application will be described as viewed from the clock output and the clock switch respectively, as shown in FIG. 8 and FIG. 9.

Fourth Embodiment

With reference to FIG. 8, it shows a flow chart of a method for clock synchronization of base stations according to a fourth embodiment of the present application.

In this embodiment, the clock synchronization scheme according to the present application will be described as viewed from the clock output by way of taking two base stations in a same machine frame as an example.

The method for clock synchronization of base stations according to this embodiment may particularly include the following steps:

Step S402: a main control board of a first base station being energized, and providing a board-in-place signal with a delay time of 5 ms.

Step S404: the main control board of the first base station judging whether the clock of the other base station is in use, and if not, proceeding to step S406; if so, closing the clock output.

The main control board of each base station is provided with a clock output judge, which may be formed as two bidirectional judgment lines. Each judgment line may particularly include three signal lines, which could be a board-in-place signal line, a clock lock signal line and a clock-in-use signal line, respectively. There are six hardware connecting wires in total. The signals are defined as board-in-place, clock lock and clock-in-use respectively. Each judgment line mutually provides the main control board of the other base station with clock use information.

In this step, the main control board of the first base station judges whether the clock-in-use state of the main control board of the second base station is to indicate that the clock reference signal of the second base station is being used by all base stations in the same machine frame, according to the signal provided by the judgment line.

Step S406: the main control board of the first base station judging whether the main control board of the other base station is in place, and if not, proceeding to step S408; if so, proceeding to step S412.

If the main control board of the first base station determines the clock reference signal of the second base station is not being used by all base stations in the same machine frame, then the main control board of the first base station may judge whether the main control board of the second base station is in place according to the signal provided by the judgment line, if in place, proceed to step S412; if not in place, proceed to step S408.

Step S408: the main control board of the first base station providing the clock in-use signal and determining to pre-emptively output the clock of the present base station.

If the main control board of the second base station is not in place, then the main control board of the first base station may output the clock in-use signal and prepare to pre-emptively output the clock reference signal of the first base station.

Step S410: the main control board of the first base station locking the clock and providing the clock lock signal, then proceeding to the step S424.

Step S412: the main control board of the first base station locking the clock and providing the clock lock.

If the main control board of the second base station is in place, the main control board of the first base station may lock the clock of the first base station, and output the clock lock signal.

Step S414: the main control board of the first base station judging whether the clock of the other base station is locked, if not, proceeding to step S416; if yes, proceeding, to step S418.

That is, the main control board of the first base station may judge whether the clock reference signal of the second base station is locked by the main control board of the second base station, if not locked, then proceeding to step S416; if locked, proceeding to step S418.

Step S416: the main control board of the first base station providing the clock in-use signal and determining, to pre-emptively output, then proceeding to step S424.

If the main control board of the first base station determines the clock reference signal of the second base station is not locked by the main control board of the second base station, then the main control board of the first base station may prepare to pre-emptively output the clock reference signal of the present base station as a clock reference signal of all base stations in the same machine frame.

Step S418: the main control board of the first base station delaying a setting time.

If the main control board of the first base station determines the clock reference signal of the second base station is locked by the main control board of the second base station, then a delay time can be made first, for example a delay time of (slot number*5) ms, to avoid a lock conflict. This is because, in the two main control boards in the same machine frame, if both of boards are locked, a slot 0 without a delay time, a slot 1 with a delay time of 5 ms and a slot 2 with a delay time of 10 ms may be possible to avoid a simultaneous pre-emption.

Step S420: the main control board of the first base station judging whether the clock of the other base station is in use, and if not, then proceeding to step S422; if so, then closing the clock output of the present base station.

The main control board of the first base station may judge whether the clock reference signal of the main control board of the second base station is being used by all base stations in the same machine frame again.

Step S422: the main control board of the first base station providing, the clock in-use signal and determining to pre-emptively output, then proceeding to step S424.

If the main control board of the first base station determines the clock reference signal of the main control board of the second base station is not being used by all base stations in the same machine frame again, then the main control board of the first base station may determine to prepare to output the clock reference signal of the present base station.

Step S424: the main control board of the first base station outputting the clock of the present base station.

That is, the main control board of the first base station outputs the clock reference signal of the first base station as a clock reference signal of all base stations in the same machine frame.

By this embodiment, the two base stations in the same machine frame competitively output the clock by a hardware judgment, randomly pre-empt the clock output right; the one which pre-empts the right outputs the clock, while the one which does not pre-empt the right closes the clock output, whereby effectively solving the clock synchronization problem of two base station systems sharing a hardware platform. Further, the front-end GPS signals of the system are shared, avoiding the engineering requirements on the multi-base station GPS antenna feeder connection, saving data of the GPS antenna feeder, saving cost of the multi-base station clock synchronization; the back-end clock output of the system is backup in real time, facilitating switching and troubleshooting of the clock.

Fifth Embodiment

With reference to FIG. 9, it shows a flow chart of switching clock for base stations according to a fifth embodiment of the present application.

In this embodiment, based on the fourth embodiment, the clock synchronization scheme of the present application will be described as viewed from of the clock switching.

The switching, of the base station clock possibly occurs when the main control board of the base station is faulted or disabled or when the base station clock is disabled by any other factors. Based on this, the switching, of the base station clock according to this embodiment may particularly include the following steps:

Step S502: the main control board of the second base station determining the other main control board is not in place, the clock of the other main control board is disabled and the clock of the other main control board is not in use.

For example, when the main control board of the first base station is faulted, the main control board of the second base station determines the main control board of the first base station is not in place, the clock of the first base station is disabled and the clock of the first base station is not in use according to the signal provided by the judgment line.

Step S504: the main control board of the second base station judging whether its clock is locked, and if so, proceeding to step S506; if not, proceeding to step S510.

That is, the main control board of the second base station judges whether the clock reference signal of the present base station is locked, and if so, proceeding to step S506; if not, proceeding, to step S510.

Step S506: the main control board of the second base station providing the clock in-use signal, and determining to pre-emptively output.

If the main control board of the second base station determines the clock reference signal of the present base station is locked, then the main control board of the second base station may provide the clock in-use signal, and prepare to pre-emptively output the clock reference signal of the present base station.

Step S508: the main control board of the second base station outputting the clock, and ending this process of clock output.

That is, the main control board of the second base station outputs the clock reference signal of the present base station as a clock reference signal of all base stations in the same machine frame.

Step S510: the main control board of the second base station judging whether its clock is enabled, and if yes, proceeding to step S512; if not, closing the clock output.

Step S512: the main control board of the second base station providing the clock in-use signal, and determining, to pre-emptively output.

If the main control board of the second base station determines the clock reference signal of the present base station is not locked and determines its clock reference signal is enabled, then the main control board of the second base station may provide the clock in-use signal through the judgment line and prepare to pre-emptively output the reference clock output of the present base station.

Step S514: the main control board of the second base station outputting the clock, and ending this process of clock output.

By this embodiment, the clock switching of multiple base stations in the same machine frame can be achieved; no matter whether the main control board outputting clock is removed or disabled, a continuous switching of the clock can be achieved, whereby ensuring the continuity and stability of the clock.

The present application aims at the case of clock synchronization of two base station systems sharing a hardware platform and fused in the same hardware platform. Since the clock synchronization signal is usually designed on a back board of the hardware platform with a clock board used as a synchronization source to provide the machine frame with synchronization signal, when the clock board and the main control board are the same board, the integrated two systems need to share the synchronization signal. Pointing toward the sharing of clock input source at front end and the switching of clock synchronization signal at back end, the present application provides a scheme of clock synchronization adaptation sharing with main control competed. The scheme employs the front-end GPS clock signal sharing and the backend clock output real-time backup, so as to solve integration of competitive main control while completely making use of on-board resources and improving the reliability of the equipment clock.

In the clock synchronization scheme according to the present application, the two main control boards (or multiple main control boards) of the two base stations (or multiple base stations) in the same machine frame are equivalent main control boards which have identical hardware and software; the signal input of GPS receiver is shared; it is possible to use one GPS antenna feeder or to simultaneously connect to two (or more) GPS antenna feeder; hardware wires are used to judge the clock output; even though the main control board of clock output is removed, the clock can continuously be switched; even though the main control board of clock output is disabled, the clock can continuously be switched; the clock synchronization of two base station systems can be ensured by one GPS antenna feeder. Compared with the clock synchronization schemes in the prior art, the present application retains existing platform evolution ideas and need not develop a new board; the front-end signal of two main control boards (or multiple main control boards) can be shared such that backup clocks are increased; the clock synchronization of two main control boards (or multiple main control boards) is formed into a mutual hot backup, improving the reliability of equipment; two base station systems (or multiple base station systems) are decoupled and are completely independent in operation-maintenance and business without mutual interference. Also, the particularity of clock synchronization signal not only requires that only one clock source is provided in one machine frame at any time, but requires a very high continuity and a stability in nanosecond; the clock synchronization schemes according to the present application may easily realize the clock switching and backup, meeting the requirements on the continuity and the stability of clock synchronization signal.

Based on the above, the present application also provides a computer readable recording medium in which a program for executing the method for clock synchronization of base stations is recorded. Herein, the specific content of the method for clock synchronization of base stations could refer to that of method embodiments, the description of which will be omitted herein.

The computer readable recording medium may comprise any mechanism for storing or transmitting, information in a readable form of a computing device (e.g., a computer). For example, the machine readable medium includes Read Only Memory (ROM), Random Access Memory (RAM), magnetic disk storage medium, optical storage medium, flash memory medium, and propagation signals (e.g., carrier wave, infrared signals, digital signals, etc.) in the forms of electrics, optics, acoustics or any other forms.

The various embodiments in the specification have been explained step by step. Each of the embodiments has only emphasized the differences from others, and the same or similar explanations between embodiments could be made reference to each other. The method embodiments are described simply somewhere, and reference could be made to the relevant parts of the system embodiments.

Described above detailedly describes the system for clock synchronization of base stations and the method for clock synchronization of base stations provided by the present application. Herein the principles and embodiments of the present application are illustrated by way of specific examples. The embodiments described above are only used to help understand the method and its main concept of the present application. Meanwhile, for an ordinary person skilled in the art, variations could be made to the specific embodiments and their application scope in accordance with the concept of the present application. In summary, the disclosure of the specification should not be construed as limiting of the present application.

The invention claimed is:

1. A system for clock synchronization of base stations, including a plurality of base stations in a machine frame, each base station having a main control board, comprises,
the main control board of each base station is provided with a Global Positioning System (GPS) receiver, a Phase-Locked Loop (PLL) and an Oven Controlled Crystal Oscillator (OCXO);
the GPS receiver on the main control board of one of the base stations is connected to a GPS antenna feeder;
the GPS receiver connected to the GPS antenna feeder is connected to a PLL on the present main control board and a PLL on the main control board of other base stations; and
the main control boards of the base stations are connected by a judgment line, and wherein,
the GPS receiver connected to the GPS antenna feeder is configured to send a clock signal to the PLL on the present main control board and the PLL on the main control board of other base stations, and the clock signal is processed to form a clock reference signal corresponding to each base station by the PLL and the OCXO on each main board; and
the judgment line is configured to provide each base station with respective states in which other base stations use clock reference signals, to each base station determining whether to output the clock reference signal of the present base station according to the respective states in which other base stations use clock reference signals.

2. The system according to claim 1, wherein,
in addition to the GPS receiver connected to the GPS antenna feeder, the GPS receiver on the main control board of other base stations is connected to the PLL on the present main control board and the PLL on the main control board of the other base stations in addition to the present base station.

3. The system according to claim 2, comprises,
the plurality of base stations include a first base station and a second base station; the main control boards of the first base station and the second base station are connected through a first judgment line and a second judgment line, the first judgment line being configured to provide the first base station with the state in which the second base station uses the clock reference signal of the second base station, and the second judgment line being configured to provide the second base station with the state in which the first base station uses the clock reference signal of the first base station.

4. The system according to claim 3, wherein,
each of the first judgment line and the second judgment line comprises a board-in-place signal line, a clock lock signal line and a clock-in-use signal line; each of the states in which the first base station and the second base station use respective clock reference signal comprises a board-in-place state, a clock lock state and a clock-in-use state, and wherein,
the board-in-place state is configured to indicate whether the main control board of the present base station is in place, the clock lock state is configured to indicate whether the clock reference signal of the present base station is clocked by the present base station, and the clock-in-use state is configured to indicate whether the clock reference signal of the present base station is used by all base stations in the machine frame.

5. The system according to claim 4, wherein
when the first or the second base station judges whether to output the clock reference signal of the present base station according to the state in which the second or the first base station uses respective clock reference signal,
if the first or the second base station determines the main control board of the second or the first base station is not in place and its clock reference signal is not being used by all base stations according to the state in which the second or the first base station uses its clock reference signal, then the first or the second base station outputs the clock-in-use signal and the clock lock signal to the second or the first base station and outputs the clock reference signal thereof as a clock reference signal of all base stations;
if the first or the second base station determines the main control board of the second or the first base station is in place and its clock reference signal is not being used by all base stations according to the state in which the second or the first base station uses its clock reference signal, then the first or the second base station outputs the clock lock signal to the second or the first base station, outputs the clock-in-use signal to the second or the first base station after determining that the clock reference signal of the second or the first base station is not being locked, and outputs the clock reference signal thereof as a clock reference signal of all base stations; and
if the first or the second base station determines the main control board of the second or the first base station is in place and its clock reference signal is not being used by all base stations according to the state in which the second or the first base station uses the clock reference signal, then the first or the second base station outputs the clock lock signal to the second or the first base station, and judges whether the clock reference signal of the second or the first base station is being used by all base stations again after determining that the clock reference signal of the second or the first base station is locked, and if the clock reference signal of the second or the first base station is not being used by all base stations, then the first or the second base station outputs the clock-in-use signal to the second or the first base station and outputs the clock reference signal thereof as a clock reference signal of all base stations.

6. The system according to claim 5, wherein
if the first or the second base station outputting the clock reference signal is faulted, the second or the first base station judges whether the clock reference signal of the present base station is locked; if so, the second or the first base station outputs the clock-in-use signal and outputs the clock reference signal of the present base station; if not, the second or the first base station judges whether the clock reference signal of the present base station is enabled, if enabled, then the second or the first base station outputs the clock-in-use signal and outputs the clock reference signal of the present base station.

7. The system according to claim 1, wherein
the GPS receiver on the main control board of each of the base stations is connected to a GPS antenna feeder.

8. A method for clock synchronization of base stations, wherein the method comprises:
a first base station receiving an external clock signal through a first Global Positioning System (GPS) antenna feeder connected to a GPS receiver on a main control board, sending the external clock signal to a Phase-Locked Loop (PLL) on the main control board of the first base station and a PLL on a main control board of a second base station, and processing the external clock signal through the PLLs and Oven Controlled Crystal Oscillators (OCXOs) on the main control boards of the first base station and the second base station respectively, to form a first clock reference signal and a second clock reference signal, wherein the GPS receiver on the main control board of the first base station is connected to the PLL on the present main control board and the PLL on the main control board of the second base station; and
the first base station obtaining a state in which the second base station uses the second clock reference signal through a first judgment line connected to the second base station, and determining whether to output the first clock reference signal or the second clock reference signal according to the state.

9. The method according to claim 8, wherein,
the GPS receiver on the main control board of the second base station is connected to the PLL on the present main control board and the PLL on the main control board of the first base station; and
the GPS receiver on the main control board of the second base station is connected to a second GPS antenna feeder.

10. The method according to claim 9, wherein the step of the first base station obtaining a state in which the second base station uses the second clock reference signal through a first judgment line connected to the second base station, comprises:
the first base station obtaining the state in which the second base station uses the second clock reference signal through a board-in-place signal line, a clock lock signal line and a clock-in-use signal line connected to the second base station, wherein the state includes a board-in-place state, a clock lock state and a clock-in-use state, the board-in-place state being configured to indicate whether the main control board of the present base station is in place, the clock lock state being configured to indicate whether the clock reference signal of the present base station is clocked by the present base station, and the clock-in-use state being configured to indicate whether the clock reference signal of the present base station is being used by all base stations in the same machine frame.

11. The method according to claim 10, wherein the method further comprises:
the second base station obtaining the state in which the first base station uses the first clock reference signal through a second judgment line connected to the first base station, wherein the second judgment line includes a board-in-place signal line, a clock lock signal line and a clock-in-use signal line.

12. The method according to claim 10, wherein the step of the first base station determining whether to output the first clock reference signal or the second clock reference signal according to the state, includes:
if the first base station determines the main control board of the second base station is not in place and the second clock reference signal is not being used by all base stations according to the state in which the second base station uses the second clock reference signal, then the first base station outputs the clock-in-use signal and the clock lock signal to the second base station, and outputs the first clock reference signal of the present base station as a clock reference signal of all base stations;
if the first base station determines the main control board of the second base station is in place and the second clock reference signal is not being used by all base stations according to the state in which the second base station uses the second clock reference signal, then the first base station outputs the clock lock signal to the second base station, outputs the clock-in-use signal to the second base station after determining that the second dock reference signal is not being locked, and outputs the first clock reference signal of the present base station as a clock reference signal of all base stations;
if the first base station determines the main control board of the second base station is in place and the second clock reference signal is not being used by all base stations according to the state in which the second base station uses the second clock reference signal, then the first base station outputs the clock lock signal to the second base station, and judges whether the second clock reference signal is being used by all base stations again after determining that the second clock reference signal is locked, and if the second clock reference signal is not being used by all base stations, then the first base station outputs the clock-in-use signal to the second base station and outputs the first clock reference signal of the present base station as a clock reference signal of all base stations.

13. A non-transitory computer readable medium in which a program is configured to execute a method for clock synchronization of base stations, the method comprising:
a first base station receiving an external clock signal through a first Global Positioning System (GPS) antenna feeder connected to a GPS receiver on a main control board, sending the external clock signal to a Phase-Locked Loop (PLL) on the main control board of the first base station and a PLL on a main control board of a second base station, and processing the external clock signal through the PLLs and Oven Controlled Crystal Oscillators (OCXOs) on the main control boards of the first base station and the second base station respectively, to form a first clock reference signal and a second clock reference signal, wherein the GPS receiver on the main control board of the first base station is connected to the PLL on the present main control board and the PLL on the main control board of the second base station; and the first base station obtaining a state in which the second base station uses the second clock reference signal through a first judgment line connected to the second base station, and determining whether to output the first clock reference signal or the second clock reference signal according to the state.

* * * * *